(12) United States Patent
Feng et al.

(10) Patent No.: US 9,740,923 B2
(45) Date of Patent: Aug. 22, 2017

(54) IMAGE GESTURES FOR EDGE INPUT

(71) Applicant: Lenovo (Singapore) Pte. Ltd., Singapore (SG)

(72) Inventors: Xin Feng, Arcadia, CA (US); Paul Hilburger, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 104 days.

(21) Appl. No.: 14/155,869

(22) Filed: Jan. 15, 2014

(65) Prior Publication Data

US 2015/0199564 A1  Jul. 16, 2015

(51) Int. Cl.
*G06K 9/00*   (2006.01)
*G06T 7/73*   (2017.01)

(52) U.S. Cl.
CPC .......... *G06K 9/00389* (2013.01); *G06T 7/73* (2017.01); *G06T 2207/10016* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 6,147,678 A * | 11/2000 | Kumar et al. | 345/158 |
| 8,411,060 B1 * | 4/2013 | Scholler | G06F 3/04883 345/173 |
| 8,558,759 B1 * | 10/2013 | Prada Gomez et al. | 345/7 |
| 2004/0193413 A1 * | 9/2004 | Wilson et al. | 704/243 |
| 2005/0238201 A1 * | 10/2005 | Shamaie | 382/103 |
| 2006/0010400 A1 * | 1/2006 | Dehlin et al. | 715/856 |
| 2008/0085048 A1 * | 4/2008 | Venetsky et al. | 382/153 |
| 2009/0040215 A1 * | 2/2009 | Afzulpurkar et al. | 345/419 |
| 2009/0073117 A1 * | 3/2009 | Tsurumi et al. | 345/158 |
| 2009/0103780 A1 * | 4/2009 | Nishihara et al. | 382/103 |
| 2010/0013944 A1 * | 1/2010 | Venetsky et al. | 348/222.1 |
| 2010/0103106 A1 * | 4/2010 | Chui | 345/166 |
| 2010/0104134 A1 * | 4/2010 | Wang et al. | 382/103 |
| 2010/0315413 A1 * | 12/2010 | Izadi | G06F 3/017 345/419 |

(Continued)

FOREIGN PATENT DOCUMENTS

| | | |
|---|---|---|
| CN | 101901052 A | 12/2010 |
| CN | 103067782 A | 4/2013 |

OTHER PUBLICATIONS

Colaço, Andrea, et al. "Mime: Compact, low power 3d gesture sensing for interaction with head mounted displays." Proceedings of the 26th annual ACM symposium on User interface software and technology. ACM, 2013.*

(Continued)

*Primary Examiner* — Sean Conner
(74) *Attorney, Agent, or Firm* — Ference & Associates LLC

(57) ABSTRACT

An aspect provides a method, including: capturing, using an image sensor, an image of a user; detecting, using a processor, a user gesture forming an edge within the image; capturing, using the image sensor, at least one additional image of the user; detecting, using the processor, a user gesture relating to the edge of the image; and committing, using the processor, a predetermined action according to the user gesture relating to the edge of the image. Other aspects are described and claimed.

18 Claims, 7 Drawing Sheets

(56) References Cited

U.S. PATENT DOCUMENTS

| | | | |
|---|---|---|---|
| 2011/0001813 A1* | 1/2011 | Kim et al. | 348/77 |
| 2011/0141009 A1* | 6/2011 | Izumi | 345/156 |
| 2011/0185318 A1 | 7/2011 | Hinckley et al. | |
| 2011/0296353 A1* | 12/2011 | Ahmed et al. | 715/848 |
| 2012/0121185 A1* | 5/2012 | Zavesky | 382/195 |
| 2012/0275686 A1* | 11/2012 | Wilson et al. | 382/154 |
| 2012/0295661 A1* | 11/2012 | Kim et al. | 455/556.1 |
| 2012/0304133 A1* | 11/2012 | Nan | G06F 3/04886 715/863 |
| 2012/0309516 A1* | 12/2012 | Langridge et al. | 463/31 |
| 2013/0021374 A1* | 1/2013 | Miao et al. | 345/633 |
| 2013/0155237 A1* | 6/2013 | Paek et al. | 348/148 |
| 2013/0227477 A1* | 8/2013 | Yahav et al. | 715/810 |
| 2013/0229499 A1* | 9/2013 | Zhao et al. | 348/51 |
| 2013/0246955 A1* | 9/2013 | Schwesig et al. | 715/767 |
| 2013/0265226 A1* | 10/2013 | Park et al. | 345/156 |
| 2013/0278504 A1* | 10/2013 | Tong et al. | 345/158 |
| 2013/0283202 A1* | 10/2013 | Zhou et al. | 715/781 |
| 2013/0283213 A1* | 10/2013 | Guendelman | G06F 3/017 715/848 |
| 2013/0293510 A1* | 11/2013 | Clifton | G06F 3/04883 345/174 |
| 2013/0293722 A1* | 11/2013 | Chen | 348/164 |
| 2013/0328766 A1* | 12/2013 | Igarashi et al. | 345/156 |
| 2013/0335324 A1 | 12/2013 | Kaplan et al. | |
| 2013/0335361 A1* | 12/2013 | Wong et al. | 345/173 |
| 2013/0343601 A1* | 12/2013 | Jia et al. | 382/103 |
| 2014/0028567 A1* | 1/2014 | Park et al. | 345/168 |
| 2014/0062862 A1* | 3/2014 | Yamashita | 345/156 |
| 2014/0118244 A1* | 5/2014 | Kaplan et al. | 345/156 |
| 2014/0125598 A1* | 5/2014 | Cheng et al. | 345/173 |
| 2014/0168062 A1* | 6/2014 | Katz | G06F 3/017 345/156 |
| 2014/0208274 A1* | 7/2014 | Smyth et al. | 715/863 |
| 2014/0208275 A1* | 7/2014 | Mongia et al. | 715/863 |
| 2014/0225918 A1* | 8/2014 | Mittal et al. | 345/633 |
| 2014/0232631 A1* | 8/2014 | Fleischmann et al. | 345/156 |
| 2014/0236996 A1* | 8/2014 | Masuko et al. | 707/776 |
| 2014/0247964 A1* | 9/2014 | Kurokawa et al. | 382/103 |
| 2014/0267004 A1* | 9/2014 | Brickner | 345/156 |
| 2014/0282224 A1* | 9/2014 | Pedley | 715/784 |
| 2014/0282274 A1* | 9/2014 | Everitt et al. | 715/863 |
| 2014/0282280 A1* | 9/2014 | Pack et al. | 715/863 |
| 2014/0285461 A1* | 9/2014 | Campbell | G06F 3/017 345/173 |
| 2014/0327611 A1* | 11/2014 | Ono et al. | 345/156 |
| 2014/0361982 A1* | 12/2014 | Shaffer | G06F 3/017 345/156 |
| 2015/0015504 A1* | 1/2015 | Lee et al. | 345/173 |
| 2015/0029095 A1* | 1/2015 | Gomez et al. | 345/156 |
| 2015/0029225 A1* | 1/2015 | Aigner | 345/650 |
| 2015/0040040 A1* | 2/2015 | Balan et al. | 715/762 |
| 2015/0062056 A1* | 3/2015 | Sood | G06F 3/044 345/174 |
| 2015/0110460 A1* | 4/2015 | Choi et al. | 386/224 |
| 2015/0123890 A1* | 5/2015 | Kapur et al. | 345/156 |
| 2015/0169176 A1* | 6/2015 | Cohen et al. | |
| 2015/0288883 A1* | 10/2015 | Shigeta | H04N 5/23293 345/642 |

OTHER PUBLICATIONS

Yeo, Hui-Shyong, Byung-Gook Lee, and Hyotaek Lim. "Hand tracking and gesture recognition system for human-computer interaction using low-cost hardware." Multimedia Tools and Applications 74.8 (2013): 2687-2715.*

* cited by examiner

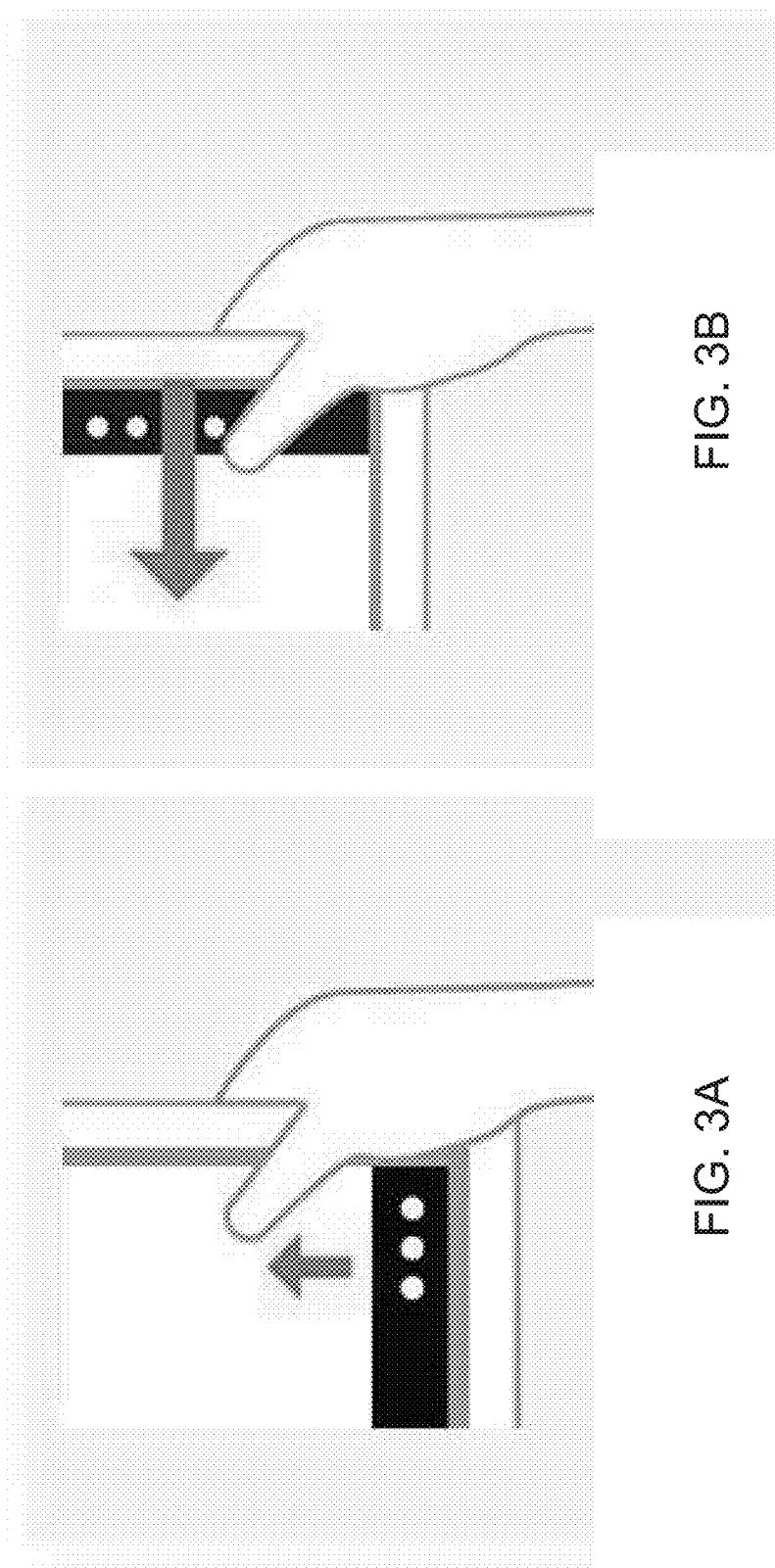

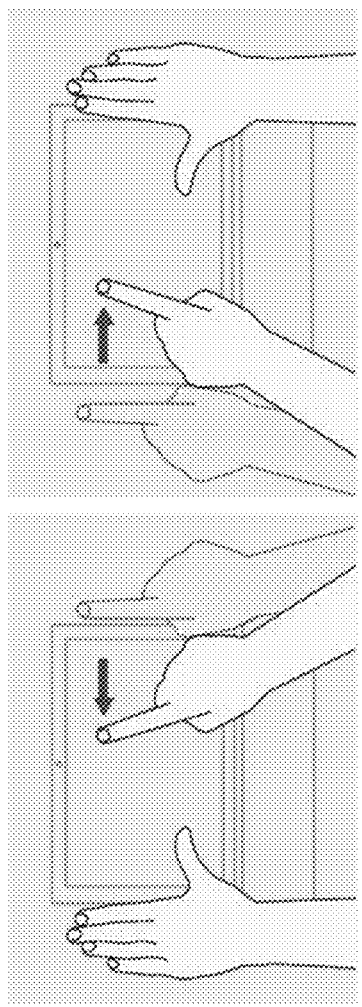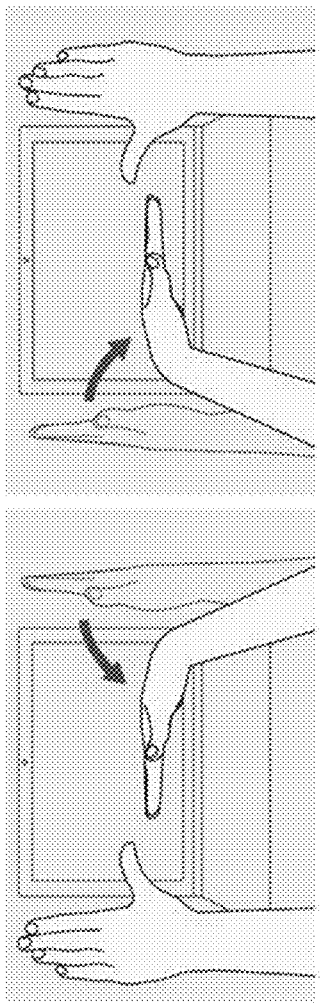

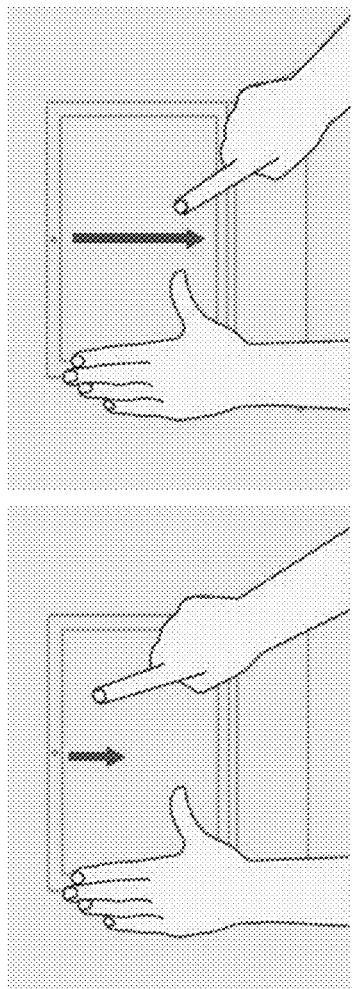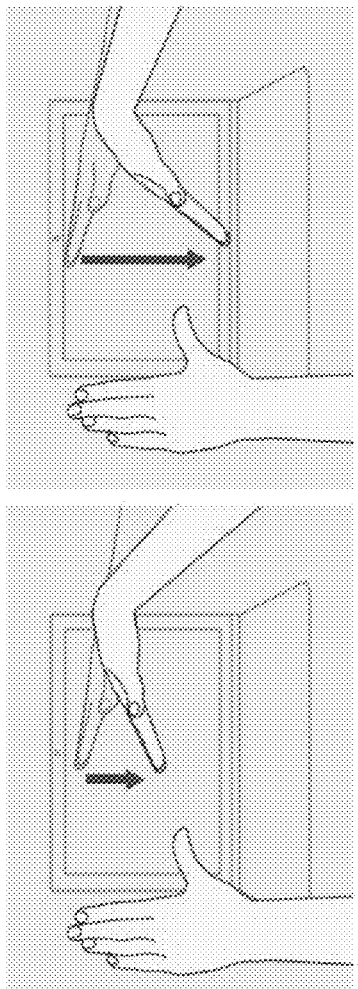

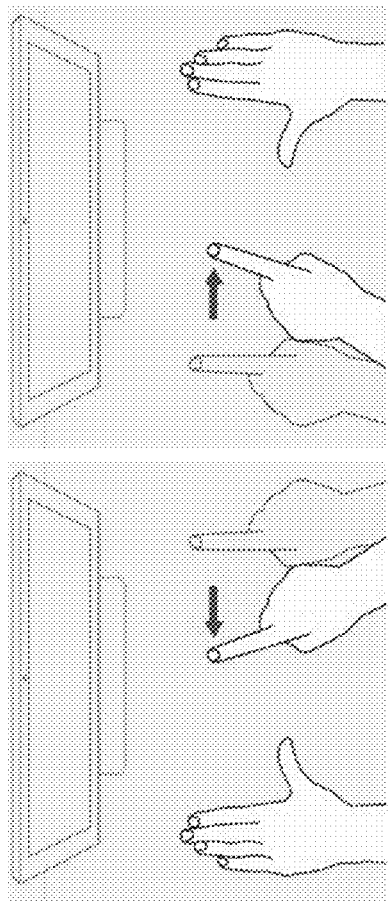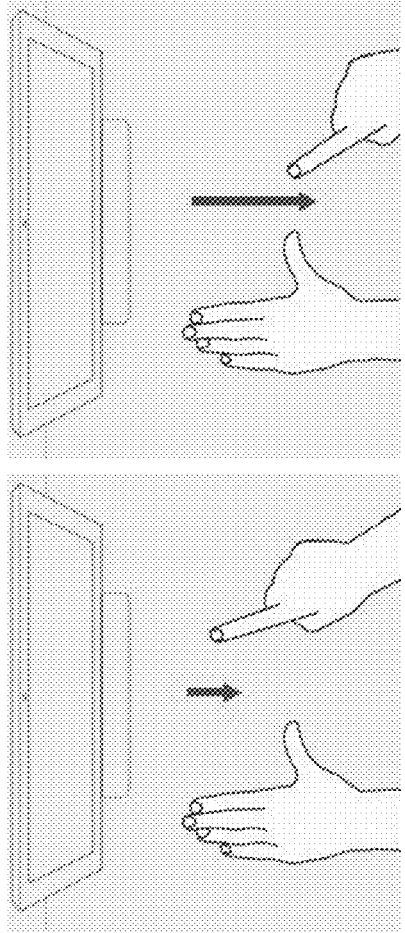

IMAGE GESTURES FOR EDGE INPUT

BACKGROUND

Information handling devices ("devices") come in a variety of forms, for example laptop computing devices, tablet computing devices, smart phones, and the like. Many devices now provide touch input functionality. That is, a user may touch a portion of the device, e.g., touch screen, and provide inputs in lieu of or in addition to more conventional modes of input such as a keyboard, mouse, etc.

Certain touch inputs have functionality mapped or associated therewith depending on which portion of the touch sensitive surface a user provides input to. An increasingly common example is an edge input, e.g., a swipe or touch input provided to the edge or peripheral portion of a touch screen is associated with a special function or set of functions.

For example, the WINDOWS 8 operating system has included edge swipe gestures for a touch interface, including touch screens and touch pads. Edge swipe gestures provide functions enhancing the user experience, such as closing an application, switching between applications, displaying the system menu or toolbar, etc. Edge swipe gestures are considered to be among the most useful gestures recently added.

BRIEF SUMMARY

In summary, one aspect provides a method, comprising: capturing, using an image sensor, an image of a user; detecting, using a processor, a user gesture forming an edge within the image; capturing, using the image sensor, at least one additional image of the user, detecting, using the processor, a user gesture relating to the edge of the image; and committing, using the processor, a predetermined action according to the user gesture relating to the edge of the image.

Another aspect provides an information handling device, comprising: an image sensor; a processor, a memory device that stores instructions accessible to the processor, the instructions being executable by the processor to: capture, using the image sensor, an image of a user; detect a user gesture forming an edge within the image; capture, using the image sensor, at least one additional image of the user; detect a user gesture relating to the edge of the image; and commit a predetermined action according to the user gesture relating to the edge of the image.

A further aspect provides a product, comprising: a storage device having code stored therewith, the code comprising: code that capture, using an image sensor, an image of a user; code that detects, using a processor, a user gesture forming an edge within the image; code that captures, using the image sensor, at least one additional image of the user; code that detects, using the processor, a user gesture relating to the edge of the image; and code that commits a predetermined action according to the user gesture relating to the edge of the image.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3(A-B) illustrates examples of edge gestures using touch input.

FIG. 4(A-B) illustrates examples of image based gestures using a single finger for executing edge gestures.

FIG. 4(C-D) illustrates examples of image based gestures using a hand for executing edge gestures.

FIG. 5(A-B) illustrates additional examples of image based gestures using a single finger for executing edge gestures.

FIG. 5(C-D) illustrates additional examples of image based gestures using a single finger for executing edge gestures.

FIG. 6(A-B) illustrates examples of perpendicular image based gestures using a single finger for executing edge gestures.

FIG. 6(C-D) illustrates examples of perpendicular image based gestures using a hand for executing edge gestures.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details.

While increasingly common, edge gestures can be challenging for users in many circumstances, particularly because conventional edge gestures rely on physically touching a touch sensitive surface, e.g., a touch pad or touch screen display. For example, it is challenging for users to perform edge swipe gestures on the system when the user is away from the system, e.g., a user sitting some distance away from the system, when the system does not have a touch interface, e.g., an edge input compatible OS implemented on a non-touch system, when the user is sitting in front of the system with a touch screen and performs or wants to perform a gesture on another surface, e.g., the table top, for ergonomic benefit, etc.

Accordingly, embodiments provide methods, systems and products that allow a user to provide image-based gestures, e.g., captured with an image sensor such as a camera, and have these image-based gestures mapped to edge gestures for execution by the system. This allows users to perform edge gestures when not physically interfacing, i.e., touching, the system. For example, an embodiment captures an image of a user, detects a user gesture forming an edge within the image, e.g., with a hand forming an edge shape, captures at least one additional image of the user, and detects a user gesture relating to the edge of the image.

The illustrated example embodiments will be best understood by reference to the figures. The following description is intended only by way of example, and simply illustrates certain example embodiments.

Figure 1:
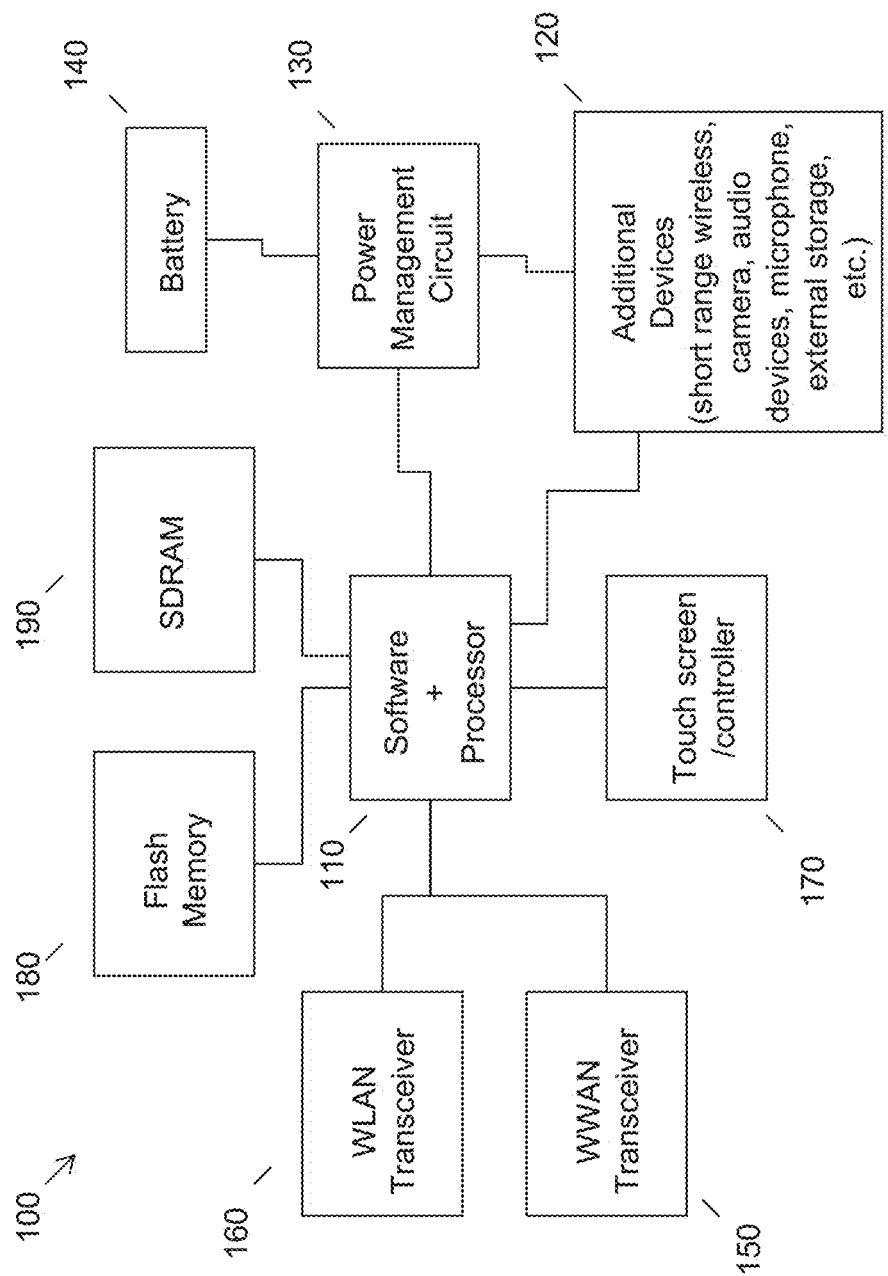
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
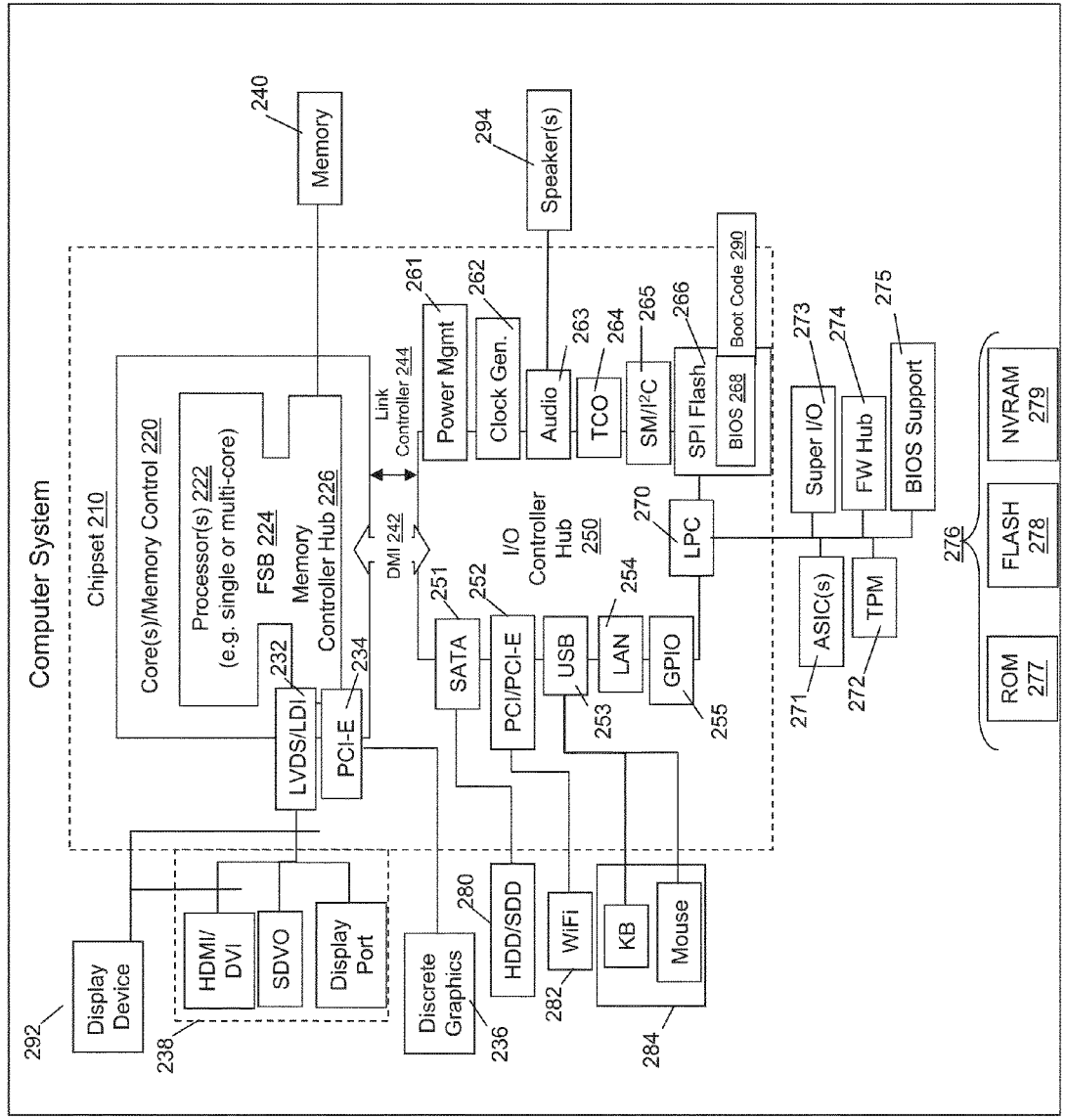
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM. The memory controller hub 226 further includes a LVDS interface 232 for a display device 292. A block 238 includes serial digital video (SDVO), HDMI/DVI, display port. The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data.

Information handling device circuitry, as for example outlined in FIG. 1 or FIG. 2, may be included in user devices such as laptop computers, desktop computer, tablet computers, etc. that implement or allow for edge gestures. As described herein, an embodiment allows a user to perform edge gestures without touching the system, e.g., without physically interfacing with a touch screen.

An embodiment allows for edge gestures to be mimicked, e.g., a touch edge swipe, by using camera/image based gestures. This facilitates use of the edge gesture capability of certain operating systems in certain situations, e.g., when the user does not wish to reach out and touch the system, since the user is likely already familiar with touch edge swipe gestures. To offer touch gestures using camera gestures may also save the cost of touch interface provided in the system.

A challenge is that a camera gesture needs to be defined to evoke edge gestures. In particular, edge gestures are triggered around the touch interface edge.

Accordingly, an embodiment defines various image based gestures that the user can perform that are keyed to an edge gesture formed by the user. For example, as illustrated in FIG. 4-FIG. 6, an embodiment allows a user to create an edge, e.g., using a hand with fingers extended together and a thumb extended therefrom, such that the image captured by the camera contains an edge. This edge formed by the user may then be used as a point of reference, much as the physical edge of the touch sensitive surface (e.g., touch screen) can be used to interpret and edge swipe gesture, e.g., swiping away from an edge as illustrated in FIGS. 3A and 3B, towards and edge, up, down, etc. Various example gestures are provided with reference to the figures in the following description.

Referring specifically to FIG. 4A, an embodiment allows a user to form an edge with a left hand, thus creating an edge in an image captured by a camera, e.g., mounted in a display of a device, and perform a swipe gesture with his or her right hand towards the hand forming the edge. This particular gesture, when detected, e.g., via analyzing the structures of the image formed by the user's hands, may be mapped to a particular action that corresponds to a touch based edge gesture, e.g., displaying the toolbar on a right side of the screen. Thus, a user may perform an image based gesture that is captured by the camera and mapped to a corresponding edge gesture.

As another example, referring to FIG. 4B, an embodiment may interpret an opposite gesture of that illustrated in FIG. 4A in another way, e.g., bringing a previously viewed or used application into view for display. Thus, a user may form an edge with the right hand and swipe a finger of the right hand towards the edge, thus mimicking in an image-based gesture the edge swipe gesture for loading a previous application.

As illustrated in FIG. 4C, a user may perform the gestures in relation to the edge in a variety of ways. Thus, a user may, rather than performing a single finger gesture with respect to an edge formed with the left hand, rotate a flattened hand towards the edge formed by the right hand, again opening a toolbar on the right side of the display. Likewise, as illustrated in FIG. 4D, a user may for the edge gesture with the right and hand rotate the left hand, again for example to load a previous application.

Many such gestures may be implemented. For example, referring to FIG. 5A, a user may form an edge with the left hand and perform a single finger partial downward movement with his or her right hand.

Illustrated in FIG. 5C, an embodiment may likewise map a flattened hand (here the right hand) partial downward gesture differently from that of a partial downward gesture performed via a single finger. Thus, an embodiment may distinguish between the single finger downward gesture and the flattened hand downward rotation gesture, e.g., to perform a different edge function such as opening a contextual menu, e.g., pulled down from a top of the display screen. Similar to the single finger gestures described herein, different degrees or ranges of motion performed with a flattened hand, e.g., as referenced to the user-formed edge, may be mapped to or associated with different edge functions. For example, as shown in 5D, an embodiment may map a longer downward rotation of a flattened hand as a close application edge gesture.

In an embodiment, a user may perform the image-based gestures in a different orientation than heretofore described. For example, as illustrated in FIG. 6(A-D), a user may perform the image-based gestures in a plane or orientation that is substantially perpendicular to, rather than substantially parallel to, a display screen or other device component. This may correspond to a use case where the user's device is on a table top or desktop and the user wishes to perform the edge gesture inputs relative to the table top or desktop. This may provide an ergonomic benefit for certain users that find it difficult to raise their hands and perform gestures relative to the plane that is parallel with the display screen. In such cases, an embodiment may utilize one or more downward facing cameras, e.g., mounted on display device, etc.

As shown in FIG. 6A, using a table top gesture, a user may again form an edge, e.g., with his or her left hand, that is detectable within the image, and thereafter perform an image based gesture that is referenced to the edge thus formed. In the example of FIG. 6A, the user may perform a single finger swipe to open a toolbar, i.e., similar to the gesture illustrated in FIG. 4A.

Likewise, a user may form an edge with the opposite hand in a table top gesture, e.g., using the right hand, and perform a single finger table top gesture with the left hand, as illustrated in FIG. 6B, for example to load a previous application, similar to the gesture illustrated in FIG. 4B.

Figure 7:
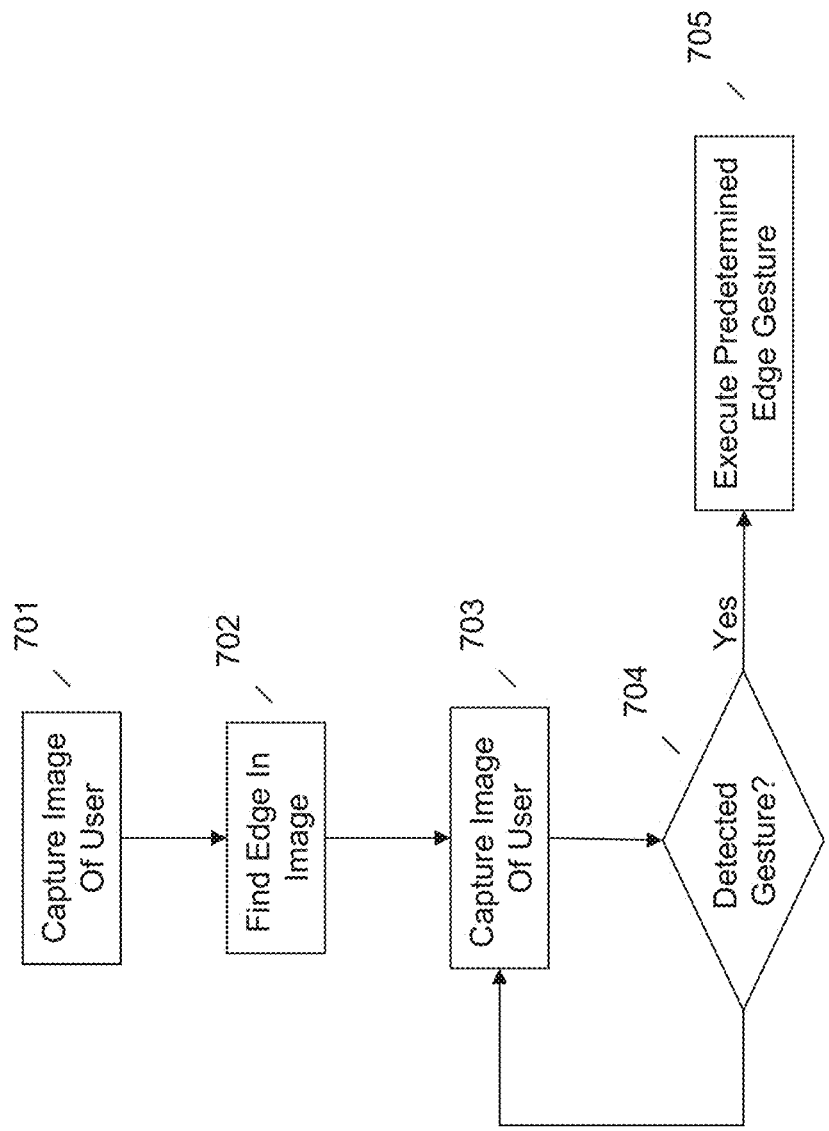
FIG. 7 illustrates an example of using image gestures for edge input.

As may be understood form the foregoing, and referring to FIG. 7 by way of example, an embodiment provides a method of using image gestures for edge input. Thus, an embodiment may capture an image at 701 (noting that more than one image, e.g., a stream of images, may be captured) and find an edge formed therein at 702, e.g., using gesture recognition technology to match the shape of the user's hand forming the edge to an edge signature.

Having the edge identified, an embodiment may proceed to detect gestures relative thereto. For example, an embodiment may capture or otherwise access another image at 703, e.g., of a user performing a single finger gesture to close an application. An embodiment may likewise use gesture recognition technology to match the movement of the user's finger relative to the edge formed by the user to a predetermined edge gesture at 704. If such a known edge gesture is detected, an embodiment may output a corresponding command, e.g., to an edge enabled operating system, such that the corresponding (touch edge gesture) action is performed at 705.

Thus, an embodiment permits a user to perform images detectable by an image sensor such as a camera of a device to operate an edge gesture enabled device. As will be understood from the description and figures herein, a user need not actually touch or physically interface with the device. This frees the user up to perform edge gestures in additional contexts and orientations, and without the need for a touch enabled device component, opening up the edge gesture capability of certain operating systems to additional devices, users and contexts.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    capturing, using an image sensor, an image of a user;
    detecting, using a processor, a first user gesture forming an edge within the image, wherein the edge is formed by a single hand of the user;
    capturing, using the image sensor, at least one additional image of the user;
    detecting, using the processor, a second user gesture in the at least one additional image, the second user gesture relating to the edge formed by the first user gesture;
    associating, using the processor, the edge formed by the first user gesture with a physical edge of a touch sensitive surface;
    associating, using the processor, the second user gesture with a predetermined action assigned to a touch gesture input relating to the physical edge of the touch sensitive surface; and
    committing, using the processor, the predetermined action assigned to the touch gesture input according to the detected second user gesture relating to the edge formed by the first user gesture.

2. The method of claim 1, wherein the second user gesture relating to the edge of the image is formed using a single finger movement of an opposite hand.

3. The method of claim 1, wherein the second user gesture relating to the edge of the image is formed using a rotation of a flattened opposite hand.

4. The method of claim 1, wherein the committed predetermined action comprises executing a function associated with an edge swipe gesture.

5. The method of claim 4, wherein the function associated with the edge swipe gesture is selected from the group consisting of closing an application, switching between applications, and displaying a toolbar.

6. The method of claim 1, wherein the touch sensitive surface is a display device, and wherein the edge within the image is formed by the single hand of the user held substantially parallel to a plane formed by the display device.

7. The method of claim 1, wherein the touch sensitive surface is a display device, and wherein the edge within the image is formed by the single hand of the user held substantially parallel to a plane perpendicular to the display device.

8. The method of claim 1, wherein the edge within the image is formed by the single hand of the user held with a thumb extended from the hand.

9. The method of claim 1, wherein the image sensor comprises a camera integrated into a display of a device housing the processor.

10. An information handling device, comprising:
    an image sensor;
    a processor;
    a memory device that stores instructions accessible to the processor, the instructions being executable by the processor to:
    capture, using the image sensor, an image of a user;
    detect a first user gesture forming an edge within the image, wherein the edge is formed by a single hand of the user;
    capture, using the image sensor, at least one additional image of the user;
    detect a second user gesture in the at least one additional image, the second user gesture relating to the edge formed by the first user gesture;
    associate the edge formed by the first user gesture with a physical edge of a touch sensitive surface;
    associate the second user gesture with a predetermined action assigned to a touch gesture input relating to the physical edge of the touch sensitive surface; and
    commit the predetermined action assigned to the touch gesture input according to the detected second user gesture relating to the edge formed by the first user gesture.

11. The information handling device of claim 10, wherein the second user gesture relating to the edge of the image is formed using a single finger movement of an opposite hand.

12. The information handling device of claim 10, wherein the second user gesture relating to the edge of the image is formed using a rotation of a flattened opposite hand.

13. The information handling device of claim 10, wherein the committed predetermined action comprises executing a function associated with an edge swipe gesture.

14. The information handling device of claim 13, wherein the function associated with the edge swipe gesture is selected from the group consisting of closing an application, switching between applications, and displaying a toolbar.

15. The information handling device of claim 10, wherein the touch sensitive surface is a display device, and wherein the edge within the image is formed by the single hand of the user held substantially parallel to a plane formed by the display device.

16. The information handling device of claim 10, wherein the touch sensitive surface is a display device, and wherein the edge within the image is formed by the single hand of the user held substantially parallel to a plane perpendicular to the display device.

17. The information handling device of claim 10, wherein the edge within the image is formed by the single hand of the user held with a thumb extended from the hand.

18. A product, comprising:
- a computer-readable storage device having code stored therewith, the code being executable by a processor and comprising:
- code that captures, using an image sensor, an image of a user;
- code that detects, using a processor, a first user gesture forming an edge within the image, wherein the edge is formed by a single hand of the user;
- code that captures, using the image sensor, at least one additional image of the user;
- code that detects, using the processor, a second user gesture in the at least one additional image, the second user gesture relating to the edge formed by the first user gesture;
- code that associates the edge formed by the first user gesture with a physical edge of a touch sensitive surface;
- code that associates the second user gesture with a predetermined action assigned to a touch gesture input relating to the physical edge of the touch sensitive surface; and
- code that commits, using the processor, the predetermined action assigned to the touch gesture input according to the detected second user gesture relating to the edge formed by the first user gesture.

\* \* \* \* \*